US012257669B2

(12) United States Patent
Wang

(10) Patent No.: US 12,257,669 B2
(45) Date of Patent: Mar. 25, 2025

(54) ADJUSTABLE WRENCH

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Weiyi Wang, Hangzhou (CN)

(73) Assignees: Hangzhou United Tools Co., Ltd. (CN); Hangzhou Great Star Industrial Co., Ltd (CN)

( * ) Notice: Subject to any disclaimer, the term of this patent is extended or adjusted under 35 U.S.C. 154(b) by 0 days.

(21) Appl. No.: 17/771,374

(22) PCT Filed: Oct. 24, 2019

(86) PCT No.: PCT/CN2019/113040
§ 371 (c)(1),
(2) Date: Sep. 30, 2024

(87) PCT Pub. No.: WO2021/077359
PCT Pub. Date: Apr. 29, 2021

(65) Prior Publication Data

US 2022/0355445 A1 Nov. 10, 2022

(51) Int. Cl.
*B25B 13/14* (2006.01)

(52) U.S. Cl.
CPC .................................... *B25B 13/14* (2013.01)

(58) Field of Classification Search
CPC .......... B25B 13/12; B25B 13/14; B25B 13/16
See application file for complete search history.

(56) References Cited

U.S. PATENT DOCUMENTS 1,344,573 A * 6/1920 Barnes .................... B25B 13/22
81/137
2,691,897 A * 10/1954 Brynge ................... F16H 55/22
74/424.7

(Continued)

FOREIGN PATENT DOCUMENTS

CN 202555627 U 11/2012
CN 202640227 U 1/2013

(Continued)

OTHER PUBLICATIONS

Extended European Search Report dated Aug. 21, 2023, for Application No. 19949638.1.

(Continued)

*Primary Examiner* — David B. Thomas
(74) *Attorney, Agent, or Firm* — Conley Rose, P.C.

(57) ABSTRACT

An adjustable wrench includes a wrench body, a second jaw and an adjustment mechanism, the wrench body including a first jaw, a neck and a handle, wherein the first jaw is a front end of the wrench body, and the neck is located between the first jaw and the handle. The first jaw is disposed opposite the second jaw to form a holding space for holding an object. The neck is provided with a through hole, the adjustment mechanism is disposed in the through hole, and the second jaw is movably connected to the neck of the wrench body by the adjustment mechanism. The adjustment mechanism is used to adjust the movement of the second jaw relative to the first jaw. The adjustable wrench therefore includes a jaw that can move relatively fast and can also be effectively prevented from skidding or returning.

10 Claims, 6 Drawing Sheets

(56) References Cited

U.S. PATENT DOCUMENTS

| | | | | |
|---|---|---|---|---|
| 4,548,104 | A | 10/1985 | Hendricks | |
| 4,961,392 | A | 10/1990 | Ballard | |
| 9,061,402 | B2 * | 6/2015 | Harvey | B25B 13/14 |
| 2003/0084757 | A1 | 5/2003 | Chen | |
| 2003/0110904 | A1 * | 6/2003 | Chen | B25B 13/14 81/165 |
| 2013/0180367 | A1 | 7/2013 | Wang | |
| 2013/0327186 | A1 * | 12/2013 | Harvey | B25B 13/14 81/126 |
| 2016/0368120 | A1 * | 12/2016 | Hoossainy | B25B 13/14 |

FOREIGN PATENT DOCUMENTS

| | | | |
|---|---|---|---|
| CN | 203784072 | U | 8/2014 |
| CN | 205588591 | U | 9/2016 |
| WO | 2016165490 | A1 | 10/2016 |

OTHER PUBLICATIONS

International Search Report dated Jul. 22, 2020, for Application No. PCT/CN2019/113040.

* cited by examiner

ADJUSTABLE WRENCH

CROSS-REFERENCE TO RELATED APPLICATIONS

This application is a 35 U.S.C. § 371 national stage application of PCT/CN2019/113040 filed Oct. 24, 2019, and entitled "Adjustable Wrench", which is incorporated herein by reference in its entirety.

FIELD OF THE INVENTION

The present application relates to the field of hand tools, and in particular to an adjustable wrench.

BACKGROUND

An adjustable wrench is a common hand tool and has an adjustable opening width to solve the problem of tightening and loosening of nuts or bolts of different specifications.

Adjustable wrenches in the prior art mainly have a single-threaded structure and a double-threaded structure. The single-threaded structure may be as shown in FIG. 1, which is a schematic diagram of a single-thread lead in the prior art. The thread on the worm has one helix and is a single-helix thread, the lead being P2. Although the worm with a single-helix thread tightens more firmly and does not come loose easily, the jaw moves relatively slowly when the worm is rotated, and the worm with a single-helix thread can withstand relatively small torque. The double-threaded structure may be as shown in FIG. 2, which is a schematic diagram of a double-thread lead in the prior art. There are two threads on the worm, the lead being P3. Although the double-threaded worm can rapidly reach a predetermined position and the worm can withstand large torque, the double-threaded adjustable wrench has the disadvantages of inadequate tightening duration and easy loosening.

SUMMARY

In view of the foregoing defects in the prior art, the present application provides an adjustable wrench, so that a jaw can move relatively fast and can be effectively prevented from skidding or returning.

According to an aspect, the present application provides an adjustable wrench, comprising a handle, a neck, a first jaw, a second jaw and an adjustment mechanism, wherein the first jaw is connected to the handle by the neck; the second jaw is movably disposed on the neck and is disposed opposite the first jaw to form a holding space for holding an object; the adjustment mechanism is disposed on the neck and is configured to be able to drive the second jaw to move relative to the first jaw to adjust the size of the holding space, wherein the adjustment mechanism comprises a worm and a pin, and the worm comprises an inner tube and thread teeth; the inner tube is of a cylinder and has an inner cavity penetrating in an axial direction; the pin passes through the inner cavity and is fixedly connected to the neck; the thread teeth are spirally disposed on the outer surface of the inner tube; the second jaw meshes with the thread teeth and is configured to be able to move relative to the first jaw as the worm rotates; and the thread teeth have more than one helix, and a lead angle of the worm is not greater than a self-locking angle, wherein the self-locking angle corresponds to the material of the worm and the second jaw.

In some embodiments, optionally, the thread teeth have two helices.

In some embodiments, optionally, the lead angle is in a range of 7° to 8°.

In some embodiments, optionally, the material of the worm and the second jaw is a steel material.

In some embodiments, optionally, the thread teeth are arc-shaped.

In some embodiments, optionally, the top of the thread teeth is a flat face.

In some embodiments, optionally, a rack is disposed on the second jaw, and the rack is provided with fine teeth capable of meshing with the thread teeth, wherein the top of the fine teeth is a flat face corresponding to the bottom of the thread teeth.

In some embodiments, optionally, a portion, in contact with the fine teeth, of the bottom of the thread teeth is a flat face.

In some embodiments, optionally, the neck is provided with a slide slot located on a side of the holding space, the slide slot is consistent with a moving direction of the second jaw, a rack is disposed on the second jaw, the rack is inserted in the slide slot, and the second jaw is movable relative to the first jaw along the slide slot to adjust the distance between the first jaw and the second jaw.

In some embodiments, optionally, the neck is provided with a through hole, and the pin passes through the worm and fastens the worm in the through hole such that the worm can rotate around the pin in the through hole.

In some embodiments, optionally, a gap is provided between the worm and the pin.

In some embodiments, optionally, the adjustment mechanism further comprises an elastic member disposed between one side, along an axis, of the worm and an inner side surface of the through hole.

In some embodiments, optionally, the elastic member is a spring.

In some embodiments, optionally, the first jaw, the neck and the handle are integrally formed.

In another aspect, the present application further provides a worm, comprising: an inner tube, the inner tube being of a cylinder; and thread teeth, spirally disposed on the outer surface of the inner tube, and meshing with a linkage mechanism, wherein the worm is configured to be rotatable around an axis of the inner tube, so as to drive the linkage mechanism meshing with the thread teeth to move; and the thread teeth have more than one helix, and a lead angle of the worm is not greater than a self-locking angle, wherein the self-locking angle corresponds to the material of the worm.

In some embodiments, optionally, the inner tube has an inner cavity penetrating in an axial direction.

In some embodiments, optionally, the thread teeth have two helices.

In some embodiments, optionally, the lead angle is in a range of 7° to 8°.

In some embodiments, optionally, the material of the worm is a steel material.

In some embodiments, optionally, the thread teeth are arc-shaped.

In some embodiments, optionally, the top of the thread teeth is a flat face.

In some embodiments, optionally, a portion, in contact with the linkage mechanism, of the bottom of the thread teeth is a flat face.

In some embodiments, optionally, the linkage mechanism has fine teeth capable of meshing with the thread teeth, wherein the top of the fine teeth is a flat face corresponding to the bottom of the thread teeth.

The present application further provides an adjustable wrench, comprising a wrench body, a second jaw and an adjustment mechanism, wherein the wrench body comprises a first jaw, a neck and a handle, the first jaw is a front end of the wrench body, and the neck is located between the first jaw and the handle; the first jaw is disposed opposite the second jaw to form a holding space for holding an object; the neck is provided with a through hole, the adjustment mechanism is disposed in the through hole, and the second jaw is movably connected to the neck of the wrench body by the adjustment mechanism; and the adjustment mechanism is configured to adjust the movement of the second jaw relative to the first jaw.

Optionally, the neck is provided with a slide slot located on a side of the holding space, the slide slot is consistent with a moving direction of the second jaw, a rear surface of the second jaw is provided with a rack, the rack is inserted in the slide slot of the neck, and the second jaw is movable relative to the first jaw along the slide slot to adjust the distance between the first jaw and the second jaw.

Optionally, the adjustment mechanism comprises a worm, a pin and an elastic member, wherein the worm is disposed in the through hole, the pin passes through a central axis of the worm and fastens the worm in the through hole, the worm rotates in the through hole through the pin, the worm is provided with thread teeth meshing with the rack of the second jaw, the elastic member is placed between one side, along the central axis, of the worm and an inner side surface of the through hole, and when the worm rotates, the thread teeth of the worm act on the rear surface of the rack of the second jaw to drive the second jaw to move relative to the first jaw.

Optionally, a thread lead angle of the thread teeth is 7° to 8°.

Optionally, the thread lead angle of the thread teeth is 7°, 7.1°, 7.2°, 7.3°, 7.4°, 7.5°, 7.6°, 7.7°, 7.8°, 7.9° or 8.0°.

Optionally, the thread teeth have at least two helices.

Optionally, the thread teeth are arc-shaped.

Optionally, the top of the rack is an arc surface or a flat face.

Optionally, the first jaw and the neck are integrally formed.

Optionally, the neck and the handle are integrally formed.

Optionally, the neck and the handle are combined through buckling.

Optionally, the neck and the handle are combined by a bolt.

Optionally, the neck and the handle are combined through welding.

Optionally, a holding surface between the first jaw and the second jaw is provided with relatively directional toothed belts.

Optionally, the handle is provided with at least one through hole.

Optionally, the surface of the handle is provided with an anti-skid layer.

Optionally, the anti-skid layer is made of rubber, silicone or plastic.

Optionally, a gap is provided between the worm and the pin.

In the adjustable wrench provided in the present application, an adjustment mechanism is disposed, so that a jaw can be effectively prevented from skidding or returning, and the time of adjusting a jaw distance can be shortened.

The concept, specific structure, and resulting technical effect of the present application are further described below in conjunction with the drawings to fully understand the object, features, and effects of the present application.

DETAILED DESCRIPTION

Figure 1:
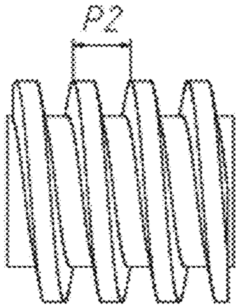
FIG. 1 is a schematic diagram of a single-thread lead in the prior art.

Preferred embodiments of the present application are described below with reference to the drawings of the description to make the technical contents clearer and easier to understand. The present application can be embodied in various forms of embodiments, and the scope of protection of the present application is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present application does not define the size and thickness of each assembly. In order to make the illustration clearer, the thickness of the component in some places of the figures is appropriately exaggerated.

Figure 3:
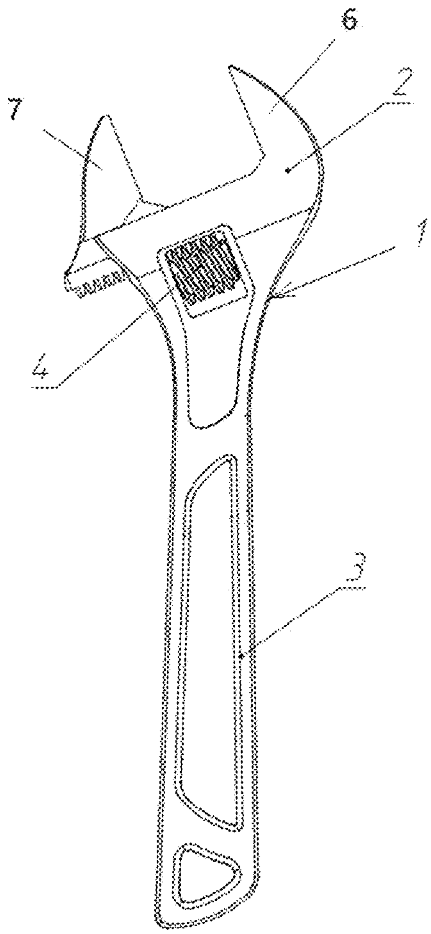
FIG. 3 is a three-dimensional structural schematic diagram of an adjustable wrench according to one embodiment of the present application.

As shown in FIG. 3, which is a three-dimensional structural schematic diagram of an adjustable wrench according to an embodiment of the present application. The adjustable wrench comprises a wrench body 1, a second jaw 7 and an adjustment mechanism 4.

The wrench body 1 comprises a first jaw 6, a neck 2 and a handle 3. The first jaw 6 is a front end of the wrench body 1. The neck 2 is located between the first jaw 6 and the handle 3.

The first jaw 6 is disposed opposite the second jaw 7 to form a holding space for holding an object.

Figure 4:
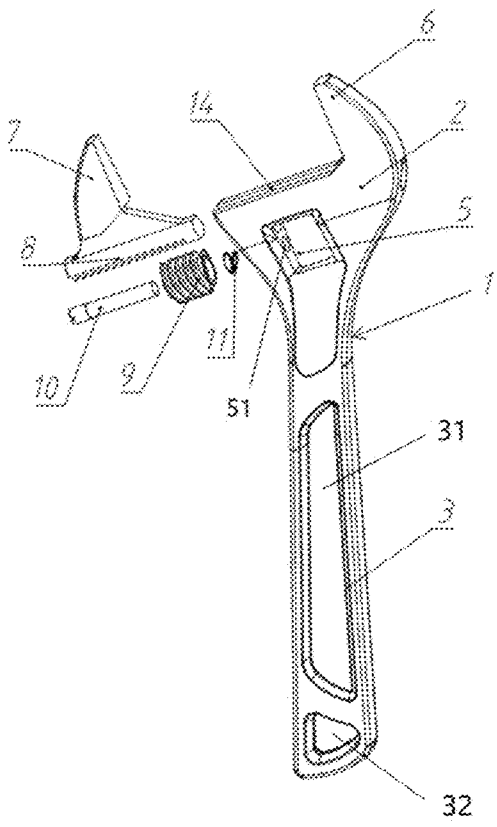
FIG. 4 is a three-dimensional exploded structural schematic diagram of the adjustable wrench in FIG. 3.

As shown in FIG. 4, which is a three-dimensional exploded structural schematic diagram of the adjustable wrench in FIG. 3. With reference to FIG. 3, the neck 2 is provided with a through hole 5. The adjustment mechanism 4 is disposed in the through hole 5. The second jaw 7 is movably connected to the neck 2 of the wrench body 1 by the adjustment mechanism 4.

The adjustment mechanism 4 is configured to adjust the movement of the second jaw 7 relative to the first jaw 6.

The neck 2 is provided with a slide slot 14 located on a side of the holding space. The slide slot 14 is consistent with a moving direction of the second jaw 7.

Figure 5:
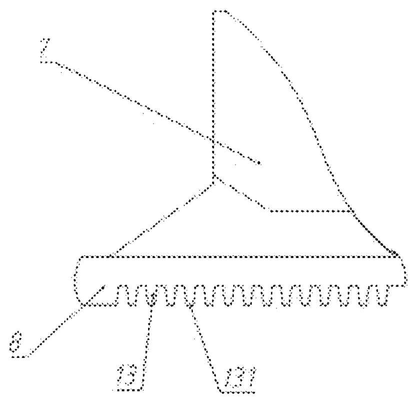
FIG. 5 is a plane schematic diagram of a second jaw of the adjustable wrench in FIG. 3.

As shown in FIG. 5, a rear surface of the second jaw 7 is provided with a rack 8. The rack 8 comprises a plurality of tooth bars 13 parallel to each other. Each tooth bar 13 is perpendicular to the moving direction of the second jaw 7. In other words, the rack 8 is perpendicular to the moving direction of the second jaw 7.

Figure 6:
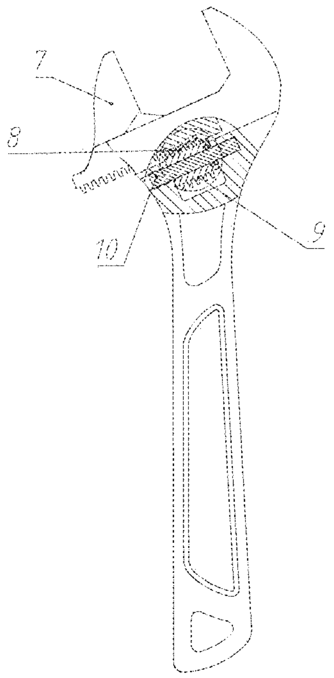
FIG. 6 is a partial sectional schematic diagram of the adjustable wrench in FIG. 3.

As shown in FIG. 6, with reference to FIG. 3 and FIG. 4, the rack 8 of the second jaw 7 is inserted in the slide slot 14 of the neck 2. The second jaw 7 is movable relative to the first jaw 6 along the slide slot 14 to adjust the distance between the first jaw 6 and the second jaw 7. That is, the size of the holding space formed by the first jaw 6 and the second jaw 7 is adjustable, so as to hold objects with different sizes.

Figure 7:
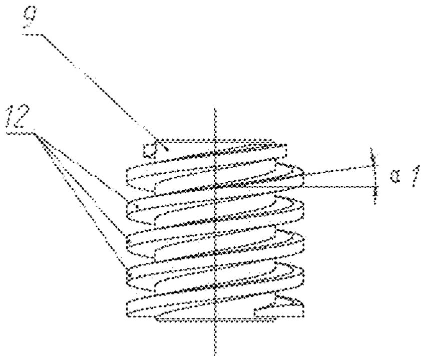
FIG. 7 is an enlarged view of a worm of the adjustable wrench in FIG. 3.

As shown in FIG. 4, the adjustment mechanism 4 comprises a worm 9, a pin 10 and an elastic member 11. As shown in FIG. 7, the worm 9 is a cylindrical worm. The outer surface of the worm 9 is provided with thread teeth 12 meshing with the rack 8 of the second jaw 7. As shown in FIG. 4 and FIG. 6, the worm 9 may be placed in the through hole 5. The neck 2 is provided with two fastening holes 51 that are located on two sides of the through hole 5 and fit the pin 10. The pin 10 passes through a central axis of the worm 9 and is inserted in the two fastening holes 51 to fasten the worm 9 in the through hole 5.

The worm 9 is rotatable around the pin 10 in the through hole 5. The elastic member 11 may be a spring or an elastic sheet. The elastic member 11 may be placed between one side, along the central axis, of the worm 9 and an inner side surface of the through hole 5, to prevent the worm 9 from rattling in the through hole 5. The outer surface of the worm 9 is provided with the thread teeth 12 meshing with the rack 8 on a rear surface of the second jaw 7, the rack 8 on the rear surface of the second jaw 7 is perpendicular to the moving direction of the second jaw 7, and a particular gap is provided between the worm 9 and the pin 10. Therefore, when the worm 9 is rotated, the thread teeth 12 of the worm 9 may act on the rack 8 on the rear surface of the second jaw 7. The thread teeth 12 and the rack 8 act on each other to drive the second jaw 7 to move relative to the first jaw 6.

In another embodiment of the present application, as shown in FIG. 7, the thread teeth 12 has a thread lead angle a1. The thread lead angle may also be referred to as a thread angle, and is an included angle between a circumference expanded from the pitch diameter of thread and a helix. The lead angle affects self-locking and anti-loosening of threads. When the lead angle is smaller, a self-locking capability is higher.

The formula for calculating the lead angle a1 is as follows: $\tan a1 = P/\pi d$, wherein $\pi$ is a constant and may be approximately equal to 3.14; d is the diameter of the worm; and P is an axial distance between corresponding points on two adjacent tooth forms of the threaded and may also be referred to as a lead. When the lead is larger, the lead angle is larger, and the worm can drive a meshing object to move by a larger distance when rotating one revolution.

Figure 8:
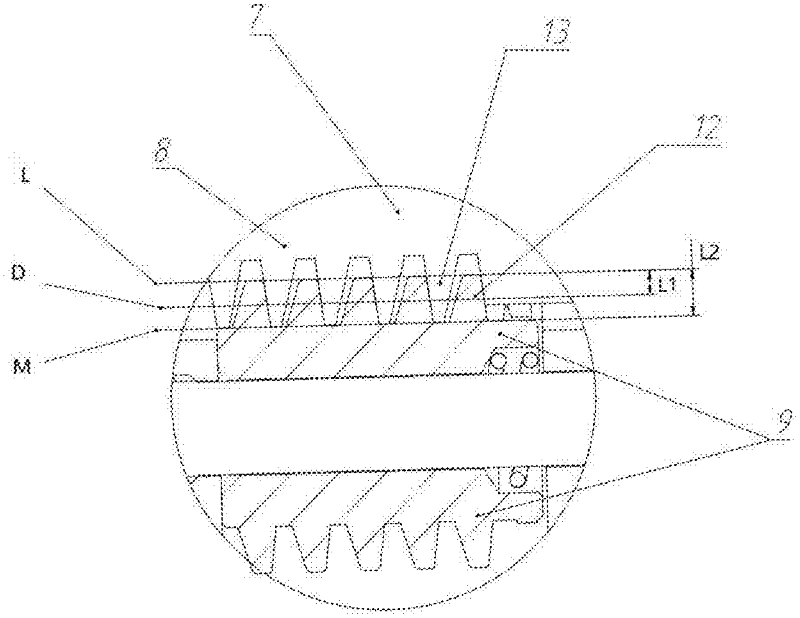
FIG. 8 is a cross-sectional schematic diagram of the pitch diameter of thread of thread teeth of the adjustable wrench in FIG. 3.
Figure 9:
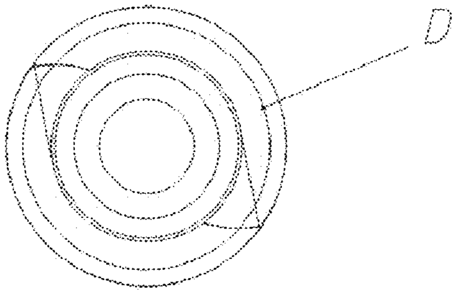
FIG. 9 is a top schematic diagram of the pitch diameter of thread of thread teeth of the adjustable wrench in FIG. 3.

The pitch diameter of thread of the thread teeth 12 may be shown in FIG. 8 and FIG. 9. The pitch diameter of thread is a middle position D between a worm top tooth line L and an adjustable jaw top tooth line M. The worm top tooth line L is a straight line formed by the top of the thread of the thread teeth 12. The adjustable jaw top tooth line M is a straight line formed by the bottom of the thread of the thread teeth 12. For example, the distance between the worm top tooth line L and adjustable jaw top tooth line M is L2. The distance between the worm top tooth line L and the pitch diameter of thread is L1. In this case, L2=2L1.

In another embodiment of the present application, to effectively prevent the worm from returning and skidding, the value of the thread lead angle a1 of the thread teeth 12 may be 7° to 8°. For example, the thread lead angle of the thread teeth a1 is any one of 7°, 7.1°, 7.2°, 7.3°, 7.4°, 7.5°, 7.6°, 7.7°, 7.8°, 7.9° or 8.0°. These values of the thread lead angle can all be used to implement the technical effect of the adjustable wrench provided in the present application. That is, the worm is effectively prevented from returning and skidding.

In this embodiment, the thread lead angle a1 of the thread teeth 12 may be 7.2°. The thread lead angle is less than a self-locking angle. Therefore, the worm 9 does not easily skid or return.

In another embodiment of the present application, to increase the thread lead and accelerate the movement of the second jaw 7 relative to the first jaw 6, the thread teeth 12 may be provided with two helices, or certainly may be provided with more than two helices. For example, the thread teeth 12 are provided with three helices.

Figure 10:
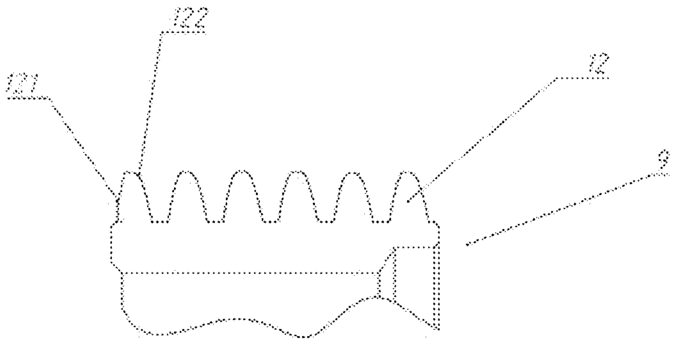
FIG. 10 is a partial enlarged schematic diagram of a worm of the adjustable wrench in FIG. 3.

In another embodiment of the present application, to increase a contact area by which the thread teeth 12 of the worm 9 mesh with the rack 8 of the second jaw 7 to improve the self-locking performance of the worm 9 and the rack 8, the thread teeth 12 may be disposed to be arc-shaped. For example, as shown in FIG. 10, the thread teeth 12 have an arc surface 121. A top end 122 of the thread teeth 12 may be an arc surface or may be a flat face. For example, the top end 122 of the thread teeth 12 may be an arc surface.

In another embodiment of the present application, the thread teeth 12 may be disposed into another shape that can be used to increase an area by which the thread teeth 12 mesh with the rack 8. For example, the thread teeth 12 may be disposed to be an arc shape with irregular protrusions.

In another embodiment of the present application, to increase an area by which the thread teeth 12 of the worm 9 mesh with the rack 8 of the second jaw 7, the top of the tooth bars of the rack 8 may be disposed to be a flat face or an arc surface. For example, as shown in FIG. 5, the top of the tooth bars 13 of the rack 8 is a flat face 131.

In another embodiment of the present application, the adjustable wrench is generally made of metal, for example, aluminum alloy, steel or iron. To provide the adjustable wrench with a more stable and secure structure and better stiffness, the first jaw 6 and the neck 2 may be made by using an integral molding process, for example, an integral molding process of casting. Certainly, an integral molding process in another form may be used.

In an embodiment of the present application, the neck 2 and the handle 3 may be integrally formed. That is, the first jaw 6, the neck 2 and the handle 3 are integrally formed, and for example, are integrally formed during casting.

In another embodiment of the present application, the neck 2 and the handle 3 may further be combined through buckling. For example, one of the neck 2 and the handle 3 has a clamping groove, and the other has a protrusion. The neck 2 and the handle 3 are fastened through buckling between the clamping groove and the protrusion.

In another embodiment of the present application, the neck 2 and the handle 3 are combined by a bolt. For example, each of the neck 2 and the handle 3 is provided with at least one hole, and the holes are opposite each other. A bolt passes through the holes to fasten the neck 2 and the handle 3.

In another embodiment of the present application, the neck 2 and the handle 3 are combined through welding.

In another embodiment of the present application, to implement a better anti-skid effect, a holding surface between the first jaw 6 and the second jaw 7 may further be provided with relatively directional toothed belts, for example, unidirectional or bidirectional toothed belts.

In another embodiment of the present application, the handle 3 may further be provided with at least one through hole. For example, as shown in FIG. 4, the handle 3 comprises a first through hole 31 and a second through hole 32, so that the weight of the adjustable wrench can be reduced.

In another embodiment of the present application, the surface of the handle 3 may further be provided with an anti-skid layer to facilitate gripping by an operator and enhance the hand feel of the adjustable wrench. For example, the anti-skid layer may be made of rubber, silicone or plastic. For example, a coating process may be used to coat the anti-skid layer on the surface of the handle 3, or the anti-skid layer may be tightly sleeved over the handle 3.

A conventional single-threaded wrench and a conventional double-threaded wrench in the prior art are compared and analyzed below to further describe the adjustable wrench provided in the present application and the structure and the technical effects that can be implemented of the foregoing specific embodiments.

In the present application, in one aspect, the number of helices of the worm is increased to increase a lead, so that the second jaw can move faster. In another aspect, it is restricted that the lead angle is not greater than the self-locking angle to keep a desirable self-locking state to avoid easy skidding or returning.

Figure 2:
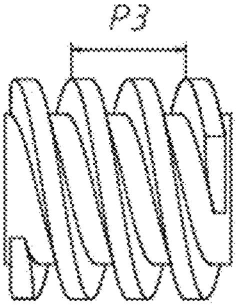
FIG. 2 is a schematic diagram of a double-thread lead in the prior art.

Refer to the single-threaded wrench in the prior art in FIG. 1 and the double-threaded wrench in the prior art in FIG. 2. The value of the lead angle of the thread of the worm of the conventional single-threaded wrench at the pitch diameter is 5° to 5.8°. The thread lead is P2. The worm with the single thread provides relatively secure tightening and does not easily come loose. However, the jaw moves relatively slowly when the worm is rotated, and the worm with the single thread can withstand relatively small torque. The value of the lead angle of the thread of the worm of the conventional double-threaded wrench in the prior art at the pitch diameter is 9.5° to 10.5°, and is greater than its self-locking angle of 8.53°. The thread lead is P3. Therefore, the adjustable jaw of the conventional double-threaded wrench moves faster. However, because the lead angle is greater than its self-locking angle, during the use of the wrench, the second jaw tends to skid and return.

Figure 11:
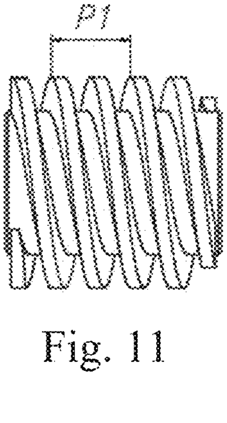
FIG. 11 is a schematic diagram of a thread lead of the adjustable wrench in FIG. 3.

The thread lead of the adjustable wrench provided in the present application may be shown in FIG. 11. The value of the thread lead angle a1 of the thread teeth 12 of the worm 9 of the adjustable wrench in this embodiment may be 7° to 8°. The thread lead is P1.

The self-locking angle is related to the material. According to the principle of friction and self-locking of objects, tan $\alpha$=f, and therefore, $\alpha$=arctan f, wherein $\alpha$ is a self-locking angle of an object, and f is a static friction coefficient. When the material of the adjustable wrench is entirely a steel material, f≈0.15 if there is no lubrication between the steel materials, and the self-locking angle a≈8.53°. It may be concluded that for adjustable wrenches with the same size, model, and specification, the thread lead P1=1.4P2 to 1.6P2. It can be calculated that for the wrenches with the same size, model, and specification, P3=1.9P2 to 2.1P2=1.2P1 to 1.4P1.

Therefore, compared with the double-threaded wrench in the prior art, the angle value of the thread lead angle of the adjustable wrench provided in the present application is 7° to 8°. That is, the lead angle is not greater than the self-locking angle. Therefore, it can be ensured that the rack 8 of the second jaw 7 does not skid and return on the thread teeth 12 of the worm 9. When the thread teeth 12 use two or more threads, compared with the single-threaded adjustable wrench in the prior art, if the worms rotate by the same angle, the second jaw 7 of the adjustable wrench provided in the present application moves faster and farther. For example, the movement distance of the worm of the adjustable wrench in the present application is approximately 1.4 times to 1.6 times that of the movement distance of the worm in the single thread adjustable wrench in the prior art.

In conclusion, in the present application, it is restricted that the lead angle is not greater than the self-locking angle, a contact area of meshing is increased to further enhance a self-locking effect, and the number of helices is increased to increase a lead to avoid easy skidding and returning and achieve fast movement, so that the advantages of both a single-threaded wrench and a double-threaded wrench are provided.

The adjustable wrench provided in the present application is described and introduced above in detail. Although the principle and implementations of the adjustable wrench provided in the present application are described herein by using specific examples, descriptions of the embodiments are merely intended to help understand the methods and core idea of the present application. It should be noted that a person of ordinary skill in the art may further make several improvements and modifications without departing from the principle of the present application. These improvements and modifications also fall within the scope of protection of the claims of the present application.

The invention claimed is:

1. An adjustable wrench, comprising a handle, a neck, a first jaw, a second jaw and an adjustment mechanism, wherein:

the first jaw is connected to the handle by the neck;

the second jaw is movably disposed on the neck and is disposed opposite the first jaw to form a holding space for holding an object;

the adjustment mechanism is disposed on the neck and is configured to be able to drive the second jaw to move relative to the first jaw to adjust a size of the holding space;

wherein the adjustment mechanism comprises a worm and a pin, and the worm comprises an inner tube and thread teeth;

the inner tube is of a cylinder and has an inner cavity penetrating in an axial direction;

the pin passes through the inner cavity and is fixedly connected to the neck;

the thread teeth are spirally disposed on an outer surface of the inner tube, and the thread teeth are arc-shaped with an arc surface at a top end of the thread teeth;

the second jaw meshes with the thread teeth and is configured to be able to move relative to the first jaw as the worm rotates; and the thread teeth have more than one helix, and a lead angle of the worm is not greater than a self-locking angle, the self-locking angle corresponding to a material of the worm and the second jaw;

wherein the lead angle is an included angle between a circumference expanded from a pitch diameter of the thread teeth and the helix, and the lead angle is determined according to a formula:

$$\tan a1 = p/\pi d,$$

where a1 is the lead angle, p is a lead of the thread teeth, and d is a diameter of the worm;

wherein the thread teeth have two helices, and the lead angle is in a range of 7° to 8°.

2. The adjustable wrench according to claim 1, wherein the material of the worm and the second jaw is a steel material.

3. The adjustable wrench according to claim 1, wherein a rack is disposed on the second jaw, and the rack is provided with fine teeth capable of meshing with the thread teeth, the top of the fine teeth being a flat face corresponding to a bottom of the thread teeth.

4. The adjustable wrench according to claim 3, wherein a portion, in contact with the fine teeth, of the bottom of the thread teeth is a flat face.

5. The adjustable wrench according to claim 1, wherein the neck is provided with a slide slot located on a side of the holding space, the slide slot is consistent with a moving direction of the second jaw, a rack is disposed on the second jaw, the rack is inserted in the slide slot, and the second jaw is movable relative to the first jaw along the slide slot to adjust a distance between the first jaw and the second jaw.

6. The adjustable wrench according to claim 5, wherein the neck is provided with a through hole, and the pin passes through the worm and fastens the worm in the through hole such that the worm can rotate around the pin in the through hole.

7. The adjustable wrench according to claim 6, wherein a gap is provided between the worm and the pin.

8. The adjustable wrench according to claim 6, wherein the adjustment mechanism further comprises an elastic member disposed between one side, along an axis, of the worm and an inner side surface of the through hole.

9. The adjustable wrench according to claim 8, wherein the elastic member is a spring.

10. The adjustable wrench according to claim 1, wherein the first jaw, the neck and the handle are integrally formed.

* * * * *